(12) United States Patent
Smith

(10) Patent No.: US 6,371,309 B1
(45) Date of Patent: Apr. 16, 2002

(54) BICYCLE STORAGE RACK

(76) Inventor: Joseph M. Smith, 71 Carrie Crescent, St. Thomas, Ontario (CA), N5R 6C2

( * ) Notice: Subject to any disclaimer, the term of this patent is extended or adjusted under 35 U.S.C. 154(b) by 0 days.

(21) Appl. No.: 09/466,088

(22) Filed: Dec. 17, 1999

(51) Int. Cl.$^7$ ................................................. A47F 7/00
(52) U.S. Cl. ......................... 211/22; 211/17; 248/230.1
(58) Field of Search ............................... 24/22, 17, 20, 24/24, 33, 175, 62; 248/218 A, 230.1, 110, 113, 298.1; D12/408

(56) References Cited

U.S. PATENT DOCUMENTS

| | | | | |
|---|---|---|---|---|
| 488,395 A | * | 12/1892 | Justice | 211/20 |
| 503,185 A | * | 8/1893 | Wood | 211/22 |
| 588,376 A | * | 8/1897 | Banker et al. | 211/17 |
| 594,627 A | * | 11/1897 | Hewlett | 21/22 |
| 596,541 A | * | 1/1898 | Price | 211/22 |
| 1,666,045 A | * | 4/1928 | Ganny et al. | 248/113 |
| 1,798,028 A | * | 3/1931 | Nachtigal | 248/113 |
| 1,925,767 A | * | 9/1933 | Mallory | 248/113 |
| 1,991,781 A | * | 5/1935 | Wolfe, Jr. | 248/113 |
| 2,547,924 A | * | 4/1951 | Citro | 84/327 |
| 3,043,440 A | * | 7/1962 | Berlin | 211/178 |
| 3,352,426 A | * | 11/1967 | Carlson | 211/22 |
| 3,507,402 A | * | 4/1970 | Barbee | 211/178 |
| 3,831,768 A | * | 8/1974 | Keller | 211/1 |
| 3,958,786 A | * | 5/1976 | Mann | 248/176 |
| 4,448,434 A | * | 5/1984 | Anderson | 248/40 |
| 4,488,497 A | * | 12/1984 | Bevans | 108/144 |
| 4,555,029 A | * | 11/1985 | Fiol | 211/22 |
| 4,836,480 A | * | 6/1989 | Besner | 248/125 |
| 4,921,245 A | * | 5/1990 | Roberts | 272/109 |
| 4,986,158 A | * | 1/1991 | Johnson | 84/327 |
| 5,044,505 A | * | 9/1991 | Spratt | 211/22 |
| 5,082,120 A | * | 1/1992 | Vega | 211/20 |
| 5,454,473 A | * | 10/1995 | Hennessey | 211/13 |
| 5,516,020 A | * | 5/1996 | Lawler et al. | 224/405 |
| 5,613,658 A | * | 3/1997 | Rogelja | 248/163.1 |
| 5,622,344 A | * | 4/1997 | Cracie | 248/171 |
| 5,634,619 A | * | 6/1997 | Alessi | 248/219.3 |
| 5,992,811 A | * | 11/1999 | McFerren et al. | 248/316.3 |
| 5,996,814 A | * | 12/1999 | Workman et al. | 211/22 |
| 6,121,527 A | * | 9/2000 | Hamm | 84/327 |
| D433,989 S | * | 11/2000 | Shimmell, Sr. | D12/408 |

* cited by examiner

*Primary Examiner*—Daniel P. Stodola
*Assistant Examiner*—Khoa Tran

(57) ABSTRACT

A bicycle storage rack for allowing a user to conveniently store one's bicycle indoors. The bicycle storage rack includes a base member having a main elongate member connected to a pair of secondary elongate members, a first upright tubular member removeably disposed upon the main elongate member, a second upright tubular member adjustably mounted to the first upright tubular member, and further includes a bracket structure for suspending a bicycle above the base member. The bracket structure includes an upper bracket member having either a hook-like member fixedly attached to the second upright tubular member or an elongate member being fixedly attached to the second upright tubular member with handle bar support members fixedly attached at the ends of the elongate member. The bracket structure also includes a lower bracket member having either a sleeve mounted about the first upright tubular member, an elongate support member attached to the sleeve and a seat post support member connected to the elongate support member and having an angled elongate member and a pronged member, or a sleeve mounted about the first upright tubular member, a hanger support member connected to the sleeve and a pronged hanger connected to the hanger support member.

1 Claim, 5 Drawing Sheets

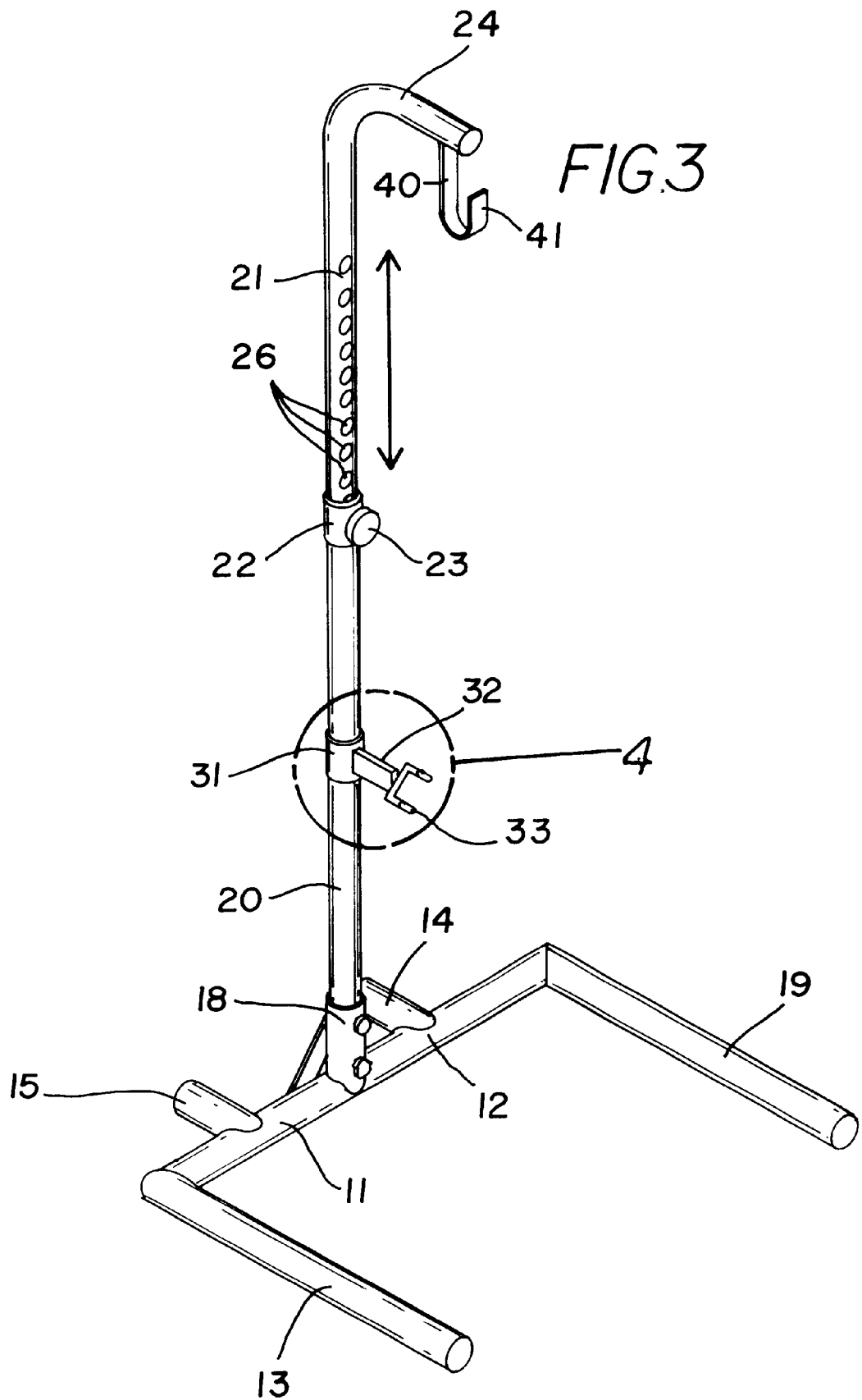

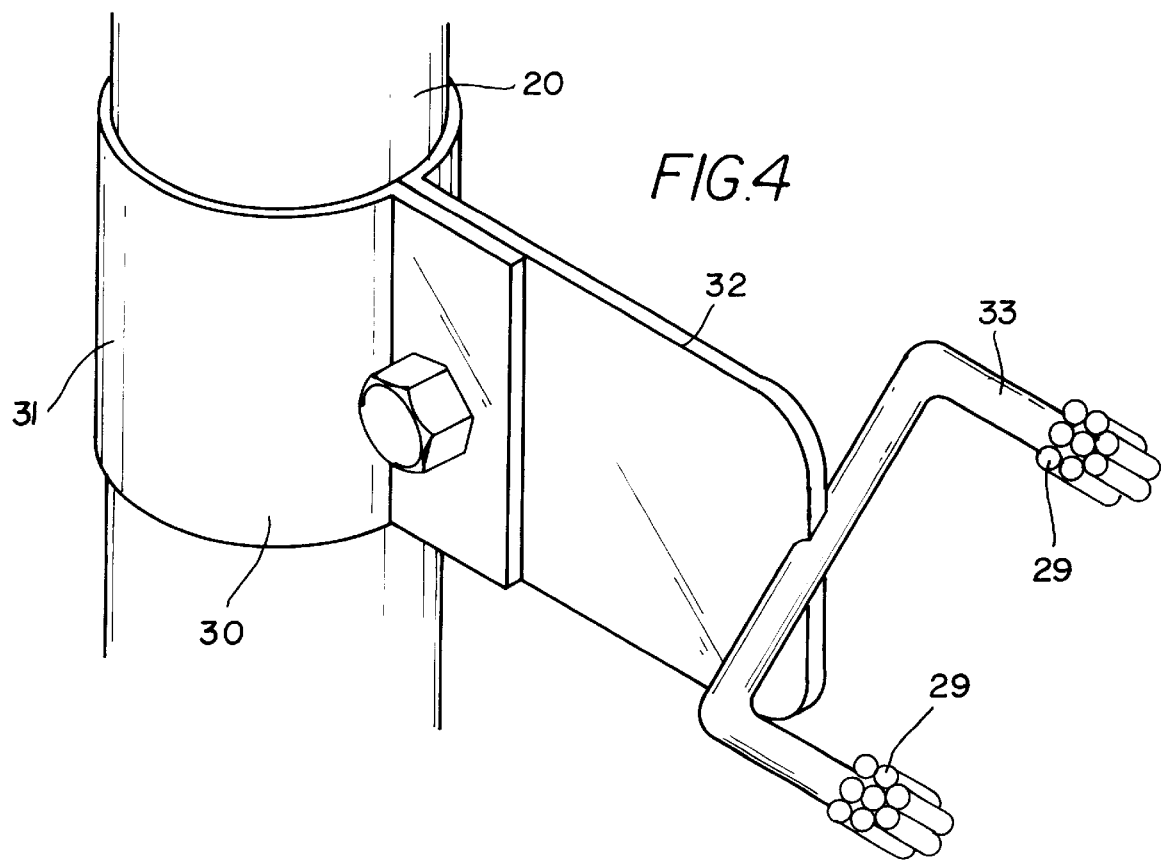
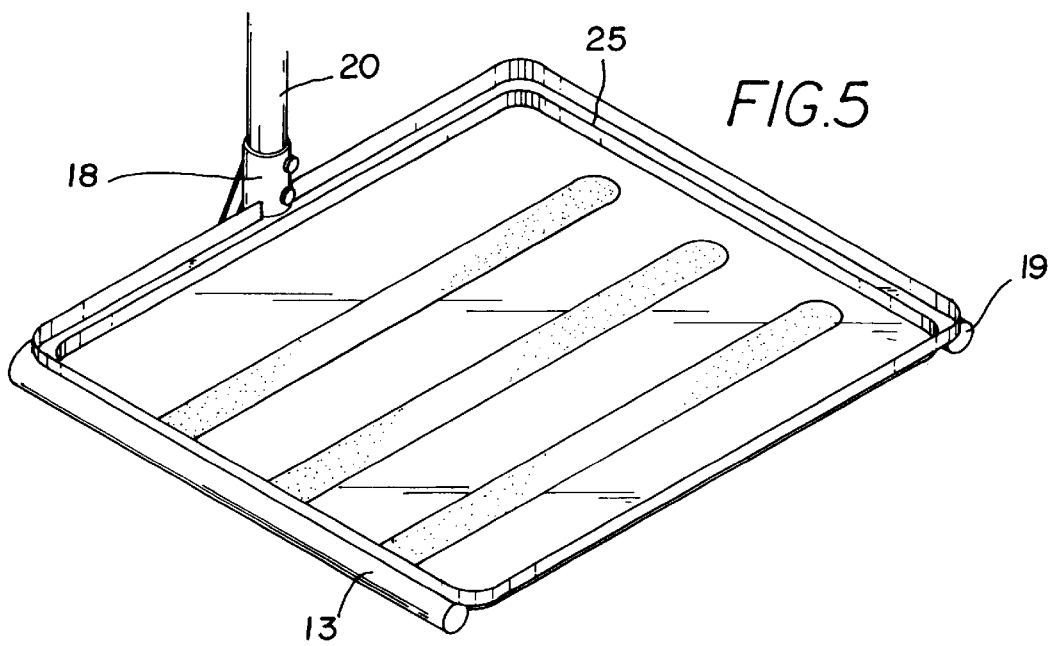

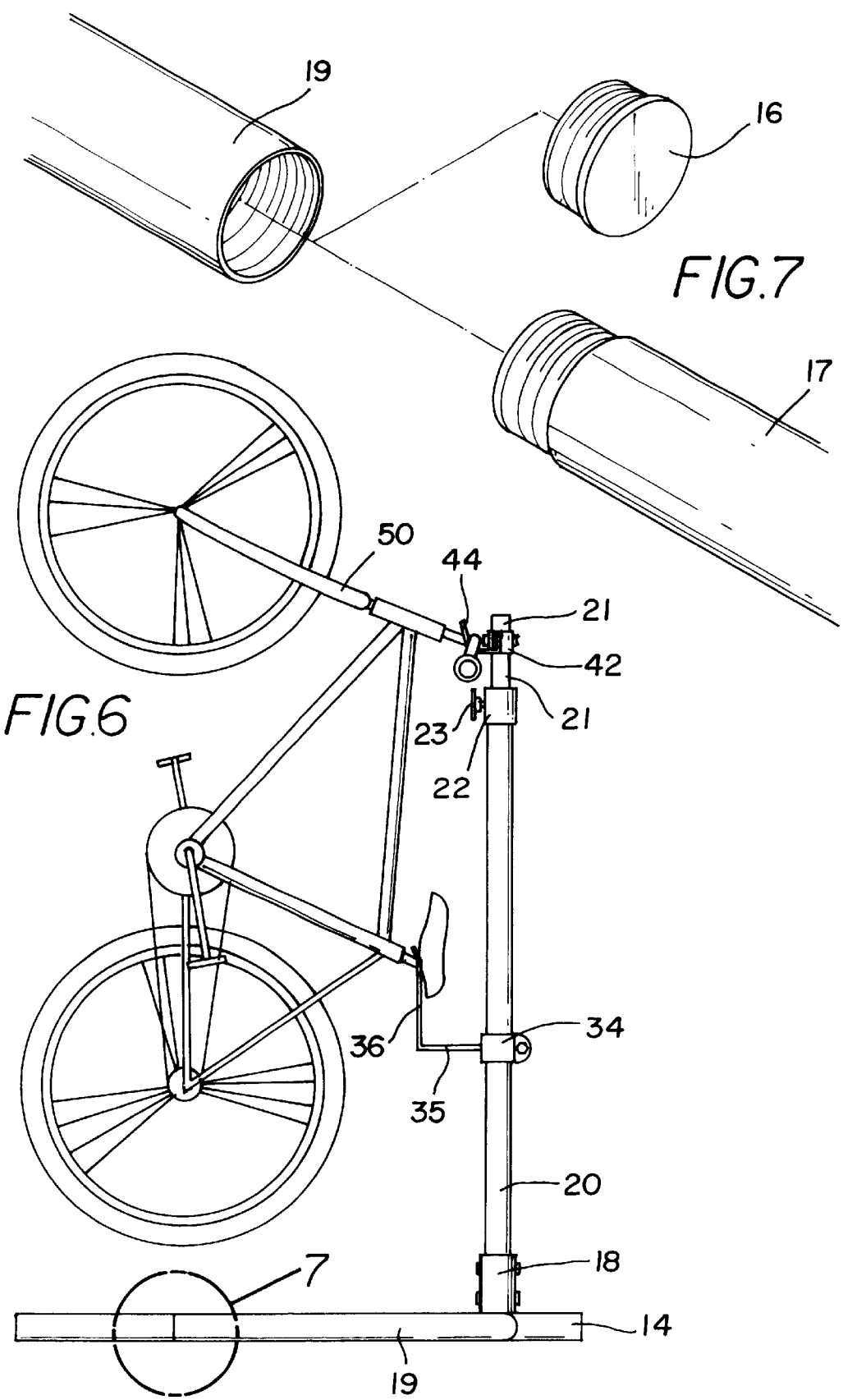

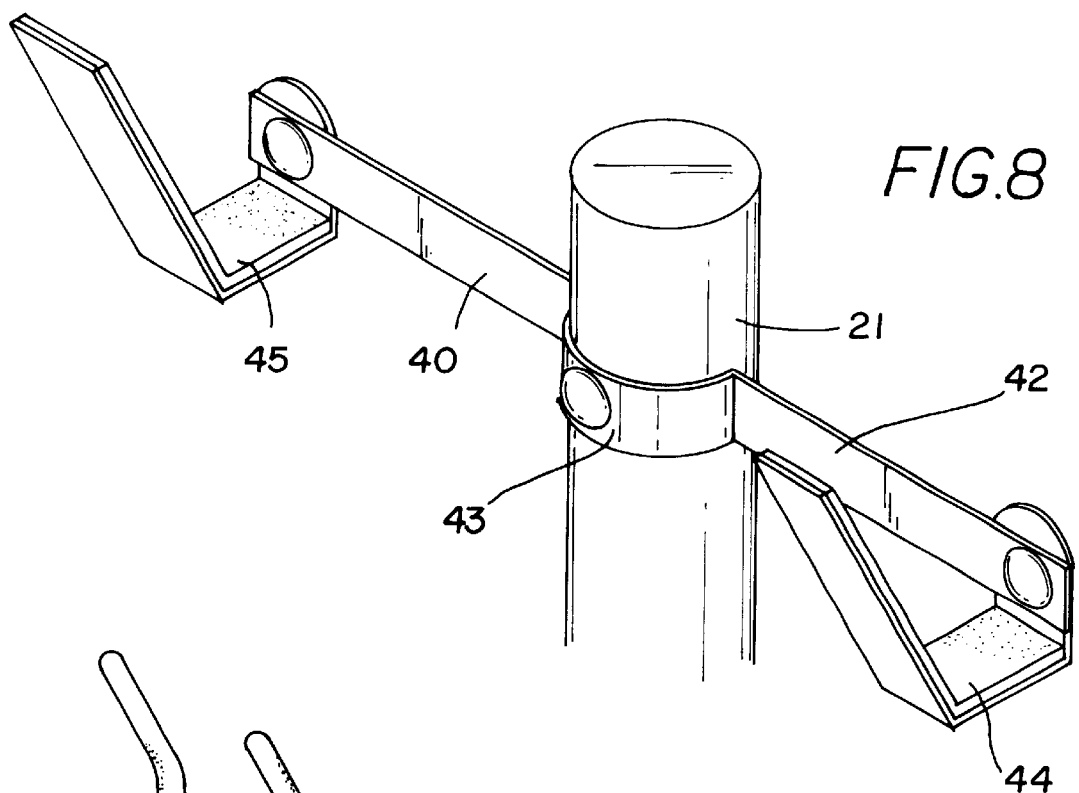
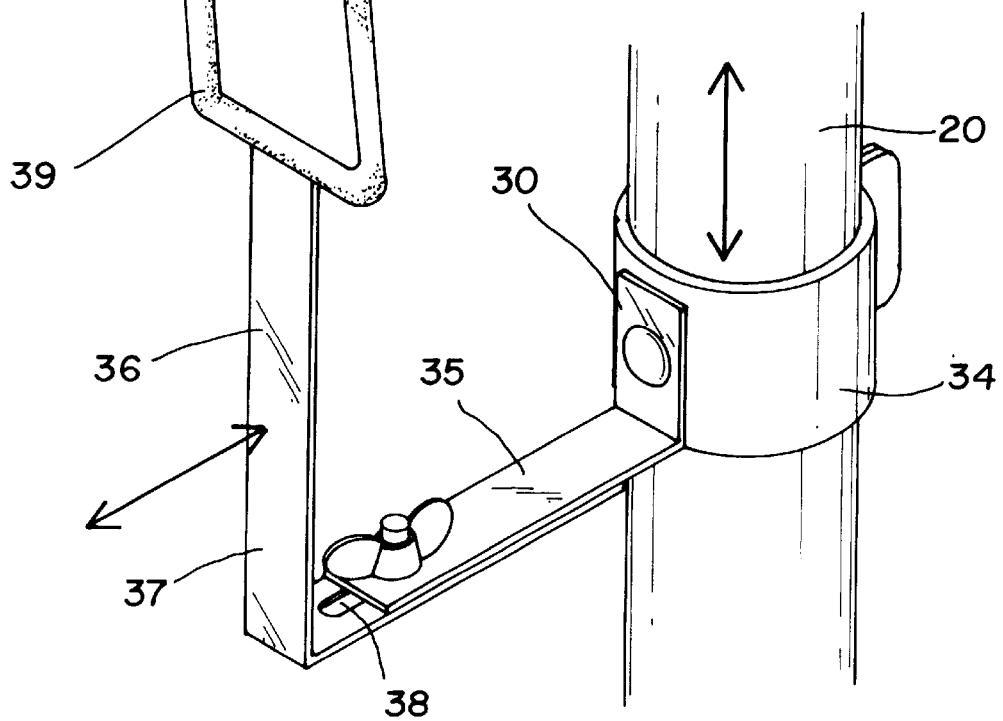

BICYCLE STORAGE RACK

BACKGROUND OF THE INVENTION

1. Field of the Invention

The present invention relates to a mounting rack for a bicycle and more particularly pertains to a new bicycle storage rack for allowing a user to conveniently store one's bicycle in doors.

2. Description of the Prior Art

The use of a mounting rack for a bicycle is known in the prior art. More specifically, a mounting rack for a bicycle heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,772,048; 706, 718; 478,805; 503,185; 615,995; and 27,769.

While these devices fulfill their respective, particular objectives and requirements, the aforementioned patents do not disclose a new bicycle storage rack. The inventive device includes a base member having a main elongate member connected to a pair of secondary elongate members, a first upright tubular member removeably disposed upon the main elongate member, a second upright tubular member adjustably mounted to the first upright tubular member, and further includes bracket means for suspending a bicycle above the base member. The bracket means includes an upper bracket member having either a hook-like member fixedly attached to the second upright tubular member or an elongate member being fixedly attached to the second upright tubular member with handle bar support members fixedly attached at the ends of the elongate member. The bracket means also includes a lower bracket member having either a sleeve mounted about the first upright tubular member, an elongate support member attached to the sleeve and a seat post support member connected to the elongate support member and having an angled elongate member and a pronged member, or a sleeve mounted about the first upright tubular member, a hanger support member connected to the sleeve and a pronged hanger connected to the hanger support member.

In these respects, the bicycle storage rack according to the present invention substantially departs from the conventional concepts and designs of the prior art, and in so doing provides an apparatus primarily developed for the purpose of for allowing a user to conveniently store one's bicycle in doors.

SUMMARY OF THE INVENTION

In view of the foregoing disadvantages inherent in the known types of a mounting rack for a bicycle now present in the prior art, the present invention provides a new bicycle storage rack construction wherein the same can be utilized for allowing a user to conveniently store one's bicycle in doors.

The general purpose of the present invention, which will be described subsequently in greater detail, is to provide a new bicycle storage rack which has many of the advantages of the mounting rack for a bicycle mentioned heretofore and many novel features that result in a new bicycle storage rack which is not anticipated, rendered obvious, suggested, or even implied by any of the prior art a mounting rack for a bicycle, either alone or in any combination thereof.

To attain this, the present invention generally comprises a base member having a main elongate member connected to a pair of secondary elongate members, a first upright tubular member removeably disposed upon the main elongate member, a second upright tubular member adjustably mounted to the first upright tubular member, and further includes bracket means for suspending a bicycle above the base member. The bracket means includes an upper bracket member having either a hook-like member fixedly attached to the second upright tubular member or an elongate member being fixedly attached to the second upright tubular member with handle bar support members fixedly attached at the ends of the elongate member. The bracket means also includes a lower bracket member having either a sleeve mounted about the first upright tubular member, an elongate support member attached to the sleeve and a seat post support member connected to the elongate support member and having an angled elongate member and a pronged member, or a sleeve mounted about the first upright tubular member, a hanger support member connected to the sleeve and a pronged hanger connected to the hanger support member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new bicycle storage rack which has many of the advantages of the mounting rack for a bicycle mentioned heretofore and many novel features that result in a new bicycle storage rack which is not anticipated, rendered obvious, suggested, or even implied by any of the prior art a mounting rack for a bicycle, either alone or in any combination thereof.

It is another object of the present invention to provide a new bicycle storage rack which may be easily and efficiently manufactured and marketed.

It is a further object of the present invention to provide a new bicycle storage rack which is of a durable and reliable construction.

An even further object of the present invention is to provide a new bicycle storage rack which is susceptible of a low cost of manufacture with regard to both materials and labor, and which accordingly is then susceptible of low prices of sale to the consuming public, thereby making such bicycle storage rack economically available to the buying public.

Still yet another object of the present invention is to provide a new bicycle storage rack which provides in the apparatuses and methods of the prior art some of the advantages thereof, while simultaneously overcoming some of the disadvantages normally associated therewith.

Still another object of the present invention is to provide a new bicycle storage rack for allowing a user to conveniently store one's bicycle in doors.

Yet another object of the present invention is to provide a new bicycle storage rack which includes a base member having a main elongate member connected to a pair of secondary elongate members, a first upright tubular member removeably disposed upon the main elongate member, a second upright tubular member adjustably mounted to the first upright tubular member, and further includes bracket means for suspending a bicycle above the base member. The bracket means includes an upper bracket member having either a hook-like member fixedly attached to the second upright tubular member or an elongate member being fixedly attached to the second upright tubular member with handle bar support members fixedly attached at the ends of the elongate member. The bracket means also includes a lower bracket member having either a sleeve mounted about the first upright tubular member, an elongate support member attached to the sleeve and a seat post support member connected to the elongate support member and having an angled elongate member and a pronged member, or a sleeve mounted about the first upright tubular member, a hanger support member connected to the sleeve and a pronged hanger connected to the hanger support member.

Still yet another object of the present invention is to provide a new bicycle storage rack that allows the user to conveniently work on one's own bicycle.

Even still another object of the present invention is to provide a new bicycle storage rack that is essentially a space saver.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of a first embodiment of the present invention.

FIG. 4 is a detailed perspective view of the lower bracket member of the first embodiment of the present invention.

FIG. 5 is a detailed perspective view of the base member and tray of the present invention.

FIG. 6 is a side elevational view of the second embodiment of the present invention.

FIG. 7 is a detailed perspective view of the secondary elongate member of the base member of the present invention.

FIG. 8 is a detailed perspective view of the upper bracket member of the second embodiment of the present invention.

FIG. 9 is a detailed perspective view of the lower bracket member of the second embodiment of the present invention.

DESCRIPTION OF THE PREFERRED EMBODIMENT

Figure 1:
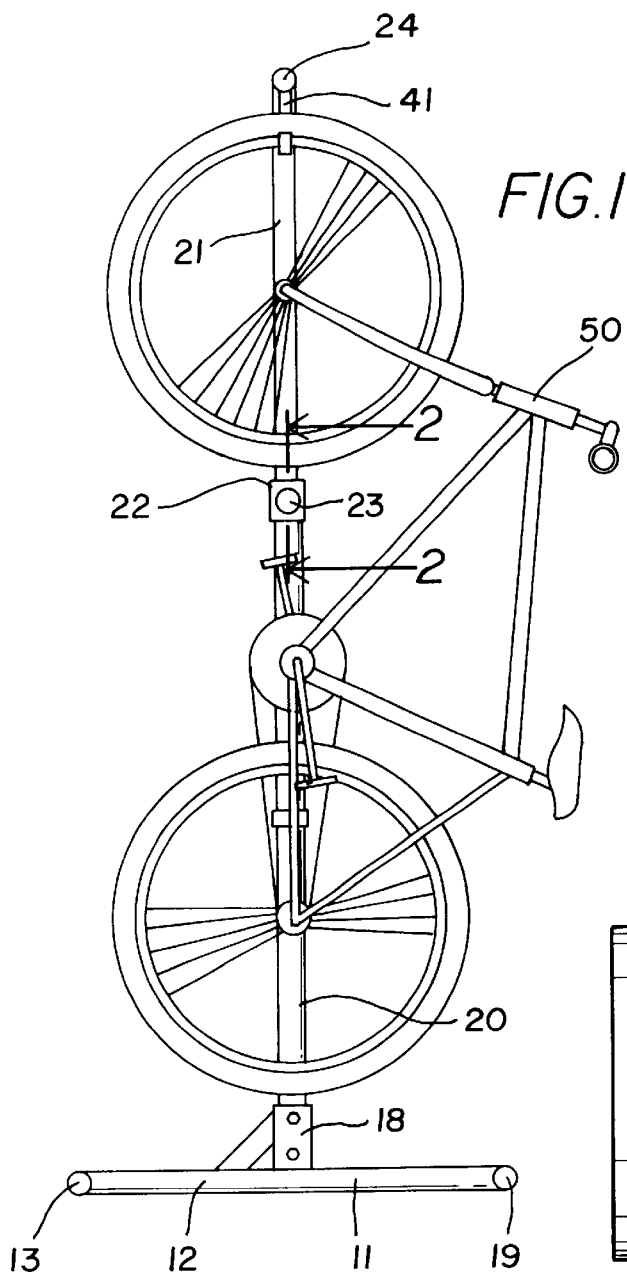
FIG. 1 is a front elevational view of a new bicycle storage rack according to the present invention.
Figure 2:
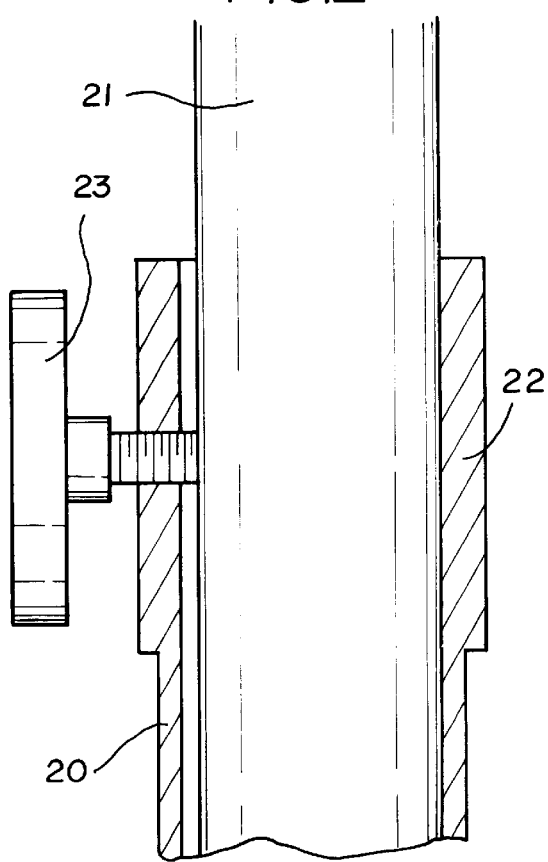
FIG. 2 is a detailed cross-sectional view of the present invention.

With reference now to the drawings, and in particular to FIGS. 1 through 9 thereof, a new bicycle storage rack embodying the principles and concepts of the present invention and generally designated by the reference numeral 10 will be described.

As best illustrated in FIGS. 1 through 9, the bicycle storage rack 10 generally comprises a base member 11 including a main elongate member 12, two secondary elongate members 13,19 securely and conventionally connected to ends of the main elongate member 12. A plurality of extension support members 14,15 are securely and conventionally connected to the main elongate member 12, and an upright tubular support member 18 is securely and conventionally connected to the main elongate member 12. Each of the secondary elongate members 13,19 has an open end which is closeable with a cap member 16. The base member 11 also includes extension members 17 each of which has a threaded end and is adapted to be threaded in the open end of a respective one of the secondary elongate members 13,19 to further stabilize the bicycle storage rack 10.

A first upright tubular member 20 is securely mounted upon the base member 11 and extends upwardly therefrom and is removably and securely received in the upright tubular support member 18. A second upright tubular member 21 adjustably extends through a top of the first upright tubular member and has a plurality of holes 26 spaced therealong.

The bicycle storage rack 10 includes a means for height adjustment of the second upright tubular member 21 relative to the first upright tubular member 20 which includes a sleeve 22 securely and conventionally fastened about the first upright tubular member 20 and a fastening member 23 having a knob and being threaded through the sleeve 22 and engageable to the second upright tubular member 21, and also includes a means for supporting a bicycle 50 above the base member 11, and a tray 25 removably mounted upon the base member 11 for receiving debris and water falling from a bicycle 50 being supported upon the bicycle storage rack 10.

The first embodiment of the bicycle storage rack 10 includes the second upright tubular member 21 having a curved upper portion 24 with the means for supporting a bicycle 50 above the base member 11 having a plurality of bracket means securely and conventionally mounted to the first and second upright tubular members 20,21. The bracket means further includes a lower bracket member 30 having a sleeve 31 movably and securely mounted with a bolt about the first upright tubular member 20. A hanger support member 32 is securely and conventionally attached to the sleeve 31 and extends outwardly therefrom, and a pronged hanger 33 is securely and conventionally attached to an end of the hanger support member 32. The lower bracket member 30 further includes a plurality of roller members 29 conventionally disposed upon ends of the pronged hanger 33 to effectively engage and retain a portion of a frame of a bicycle 50 to the pronged hanger 33 with the roller members 29 being essentially made of nylon. The bracket means further including an upper bracket member 40 having a hook-like 41 member securely and conventionally attached or welded to and suspended from an end of the curved upper portion 24.

As a second embodiment, the bracket means includes a lower bracket member 30 which includes a sleeve 34 securely and movably mounted with a bolt about the first upright tubular member 20, an elongate support member 35 securely attached with a bolt to the sleeve 34, and a seat post support member 36 having an angled elongate member 37 fastened to the elongate support member 35 with a bolt and having a pronged member 39 securely attached and welded to a first end of the angled elongate member 37. The angled elongate member 37 has a longitudinal slot 38 near a second end thereof and is adjustable relative to the elongate support member 35. The bracket means also includes an upper bracket member 40 which includes an elongate member 42 securely and conventionally attached to the second upright tubular member 21, and further includes a pair of handle bar support members 44,45 securely attached with bolts at ends of the elongate member 42. The elongate member 42 has an arcuate central portion 43 which is adapted to fit about the second upright tubular member 21. Each of the handle bar support members 44,45 includes a first end portion and a second portion which are angled relative to a central portion. The first end portion is angled upwardly relative to the base member 11 with the central portion being disposed generally parallel with the base member 11.

In use, the bicycle storage rack 10 can be easily and conveniently constructed in the user's garage or house with a bicycle 50 being conveniently mounted upon the bicycle storage rack 10 in such a way so as to save storage space.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bicycle storage rack comprising:

a base member including a main elongate member, a plurality of secondary elongate members securely connected to ends of said main elongate member, a plurality of extension support members securely connected to said main elongate member, and an upright tubular support member securely connected to said main elongate member each of said secondary elongate members having an open end, a cap member closing the open end, said base member including extension members each of which has a threaded end and is adapted to be threaded in said open end of a respective one of said secondary elongate members to further stabilize said bicycle storage rack;

a first upright tubular member being securely mounted upon said base member and extending upwardly therefrom, said first upright tubular member being removably and securely received in said upright tubular support member;

a second upright tubular member adjustably extending through a top of said first upright tubular member;

means for height adjustment of said second upright tubular member relative to said first upright tubular member including a sleeve securely fastened about said first upright tubular member and a fastening member having, a knob and being threaded through said sleeve and engageable to said second upright tubular member;

means for supporting a bicycle above said base member;

a tray removably mounted upon said base member for receiving debris and water falling from a bicycle being supported upon said bicycle storage rack; and wherein said second upright tubular member further including a curved upper portion, said means for supporting a bicycle above said base member including a plurality of bracket means securely mounted to said first and second upright tubular members, said bracket means further including a lower bracket member having a sleeve movably and securely mounted about said first upright tubular member, a hanger support member being securely attached to said sleeve and extending outwardly therefrom, and a pronged hanger securely attached to an end of said hanger support member, said lower bracket member further including a plurality of roller members disposed upon ends of said pronged hanger to effectively engage and retain a portion of a frame of a bicycle to said pronged hanger, said roller members being essentially made of nylon, said bracket means further including an upper bracket member having a hook-like member securely attached to and suspended from an end of said curved upper portion.

\* \* \* \* \*